United States Patent
Li et al.

(10) Patent No.: US 10,491,058 B2
(45) Date of Patent: Nov. 26, 2019

(54) SINGLE PHASE PERMANENT MAGNET MOTOR

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 252 days.

(21) Appl. No.: 15/260,734

(22) Filed: Sep. 9, 2016

(65) Prior Publication Data

US 2017/0077769 A1   Mar. 16, 2017

(30) Foreign Application Priority Data

Sep. 10, 2015 (CN) .......................... 2015 1 0575665

(51) Int. Cl.
| H02K 1/16 | (2006.01) |
| --- | --- |
| H02K 1/14 | (2006.01) |
| H02K 21/16 | (2006.01) |
| H02K 1/27 | (2006.01) |

(52) U.S. Cl.
CPC ............... *H02K 1/16* (2013.01); *H02K 1/146* (2013.01); *H02K 1/27* (2013.01); *H02K 1/278* (2013.01); *H02K 21/16* (2013.01)

(58) Field of Classification Search
CPC .......... H02K 1/16; H02K 1/165; H02K 1/146; H02K 21/16

USPC ............... 310/216.015–216.019, 216.059
See application file for complete search history.

(56) References Cited

U.S. PATENT DOCUMENTS

| 3,469,136 | A | * | 9/1969 | Jenkinson | ............... H02K 1/16 |
| --- | --- | --- | --- | --- | --- |
| | | | | | 310/216.059 |
| 4,496,887 | A | * | 1/1985 | Ichihara | ............... H02K 29/08 |
| | | | | | 310/156.46 |
| 5,250,867 | A | * | 10/1993 | Gizaw | ............... H02K 21/16 |
| | | | | | 310/156.12 |
| 5,773,908 | A | | 6/1998 | Stephens et al. | |
| 5,861,699 | A | * | 1/1999 | Kopac | ............... H02K 1/12 |
| | | | | | 310/179 |
| RE37,576 | E | * | 3/2002 | Stephens | ............... F23N 1/062 |
| | | | | | 310/156.01 |

(Continued)

FOREIGN PATENT DOCUMENTS

JP        2009189163 A      8/2009

*Primary Examiner* — Jeremy A Luks
(74) *Attorney, Agent, or Firm* — Muncy, Geissler, Olds & Lowe, P.C.

(57) ABSTRACT

A single phase permanent magnet motor includes a stator and a rotor relative to the stator. The stator includes a stator core with a winding wound therearound. The stator core includes stacked first and second stator core laminations. The first stator core lamination includes a plurality of first pole shoes. The second stator core lamination includes a plurality of second pole shoes. The structures of the first pole shoes and the second pole shoes are different. The first pole shoes and the second pole shoes are stacked substantially along the axial direction of the motor. The present invention reduces vibration and noise caused by the use of a single type of core laminations in the prior art.

18 Claims, 14 Drawing Sheets

(56) References Cited

U.S. PATENT DOCUMENTS

| | | | | |
|---|---|---|---|---|
| 6,747,379 B2* | 6/2004 | LaBrush | ............ | H02K 1/04 310/254.1 |
| 2008/0197794 A1* | 8/2008 | Vermeir | ............ | H02P 6/085 318/400.06 |
| 2012/0256513 A1* | 10/2012 | Kessler | ............ | H02K 1/148 310/216.016 |
| 2013/0002058 A1* | 1/2013 | McIntosh | ............ | H02K 1/185 310/43 |

* cited by examiner

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510575665.X filed in The People's Republic of China on Sep. 10, 2015.

FIELD OF THE INVENTION

The present invention relates to a single phase permanent magnet motor, and in particular to a single phase permanent magnet motor having a laminated stator core.

BACKGROUND OF THE INVENTION

In a conventional single phase permanent magnet motor, a stator core is provided as an integral structure, i.e. an outer ring portion and teeth of a stator core are formed at the same time into an integral structure. Large slot openings are formed between pole shoes of adjacent teeth for facilitating the winding of windings. In the single phase permanent magnet motor as such configured, the presence of the large slot openings can make the motor generate an unduly large cogging torque. The cogging torque can result in the motor generating vibration and noise. Furthermore, because of the limitation of the large slot openings, the motor has a small startup angle and poor startup reliability

SUMMARY OF THE INVENTION

Thus, there is a desire for a new single phase permanent magnet motor with improved startup reliability.

The present invention provides a single phase permanent magnet motor including a stator and a rotor rotatable relative to the stator. The stator includes a stator core and a winding wound around the stator core. The rotor includes a plurality of permanent magnetic poles. The stator core includes at least one first stator core lamination and at least one second stator core lamination that are stacked. The first stator core lamination comprises a plurality of first pole shoes. The second stator core lamination comprises a plurality of second pole shoes. The structures of the first pole shoes and the second pole shoes are different, and the first pole shoes and the second pole shoes are stacked substantially along the axial direction of the motor.

Preferably, a first slot opening is defined between each two adjacent first pole shoes, a second slot opening is defined between each two adjacent second pole shoes, a width of the first slot opening is not equal to a width of the second slot opening.

Preferably, the first pole shoes and the second pole shoes cooperatively define a receiving space therebetween, the rotor is disposed in the receiving space, the first pole shoe and the permanent magnetic pole of the rotor form an air gap therebetween, and a width of the first slot opening is greater than zero and less than four times of a minimum thickness of the air gap.

Preferably, each first stator core lamination further comprises a first outer ring portion and a plurality of first tooth bodies coupled to the first outer ring portion, the first pole shoes are coupled to the first tooth bodies respectively, each second stator core lamination comprises a second outer ring portion and a plurality of second tooth bodies coupled to the second outer ring portion, the second pole shoes are coupled to the second tooth bodies respectively, the first outer ring portion and the second outer ring portion are stacked substantially along an axial direction of the motor, the first tooth bodies and the second tooth bodies are stacked substantially along the axial direction of the motor.

Preferably, portions of each second pole shoe at opposite sides of a center line of one corresponding second tooth body are asymmetric about the center line of the corresponding second tooth body.

Preferably, the portions of each second pole shoe at opposite sides of the center line of the corresponding second tooth body have different lengths.

Preferably, inner surfaces of the portions of each second pole shoe at opposite sides of the center line of the corresponding second tooth body are spaced from a center of the rotor by a changing distance.

Preferably, the motor further comprises a positioning slot defined in each first pole shoe, and each positioning slot is spaced from two adjacent first tooth bodies by different distances.

Preferably, the number of the positioning slots is equal to or an integer times of the number of the permanent magnetic poles of the rotor.

Preferably, the positioning slot is a groove exposed from an inner circumferential surface of the first pole shoe.

Preferably, the positioning slot is an invisible hole located between an outer circumferential surface and the inner circumferential surface of the first pole shoe.

Preferably, the first tooth bodies and the first outer ring portion are separately formed, and the second tooth bodies and the second outer ring portion are separately formed.

Preferably, the first stator core lamination includes a plurality of first stator core parts joined along a circumferential direction of the stator, each first stator core part includes a first arcuate yoke segment, the first tooth body extending from the first arcuate yoke segment, and the first pole shoe extending from a radial distal end of the first tooth body to two circumferential sides of the first tooth body. The second stator core lamination includes a plurality of second stator core parts joined along the circumferential direction of the stator, each second stator core part includes a second arcuate yoke segment, the second tooth body extending from the second arcuate yoke segment, and the second pole shoe extending from a radial distal end of the second tooth body to two circumferential sides of the second tooth body.

Preferably, inner circumferential surfaces of the first pole shoes of the first stator core lamination are located on a same cylindrical surface.

Preferably, an inner circumferential surface of the first pole shoe and an inner circumferential surface of the second pole shoe are located on a same cylindrical surface.

Preferably, the first pole shoes and the second pole shoes cooperatively define a receiving space therebetween, the rotor is disposed in the receiving space, and an outer circumferential surface of the permanent magnetic pole and inner circumferential surfaces of the first pole shoes or the second pole shoes are respectively located on two concentric cylindrical surfaces.

Preferably, inner circumferential surfaces of the first pole shoes or the second pole shoes are located on a cylindrical surface, and an outer circumferential surface of the permanent magnetic pole is spaced from a center of the rotor by a distance that progressively decreases from a circumferential center to two circumferential ends of the outer circumferential surface of the permanent magnetic pole.

Preferably, the stator core comprises at least one group of first stator core laminations and at least one group of second stator core laminations, each group of first stator core laminations comprises at least one said stator core lamination, each group of second stator core laminations comprises at least one said stator core lamination, the at least one group of first stator core laminations and the at least one group of second stator core laminations are alternately stacked along an axial direction of the motor.

The single phase permanent magnet motor of the present invention uses different types of stator core laminations with different structures that are stacked to form the stator core, which obtains the advantages of different stator core laminations while overcoming or reducing the shortcomings caused by the use of a single type of core laminations.

DETAILED DESCRIPTION OF THE PREFERRED EMBODIMENTS

Figure 1:
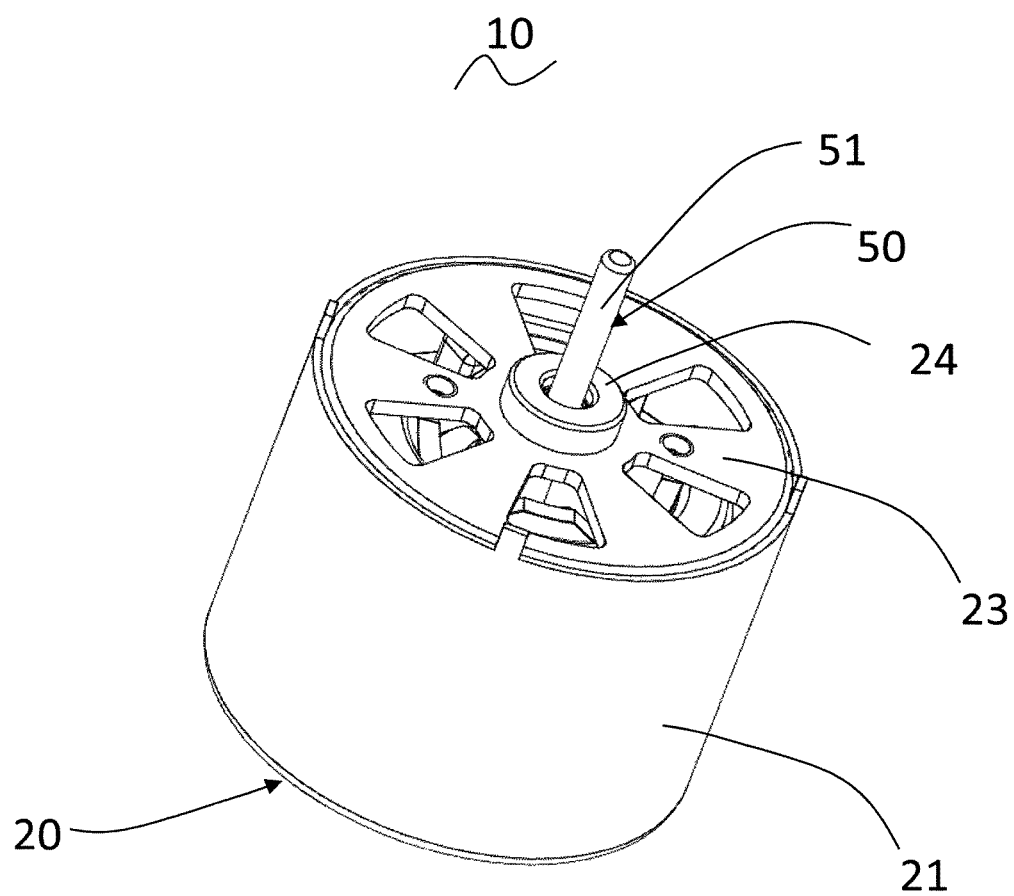
FIG. 1 illustrates a single phase permanent magnet motor according to a first embodiment of the present invention.
Figure 2:
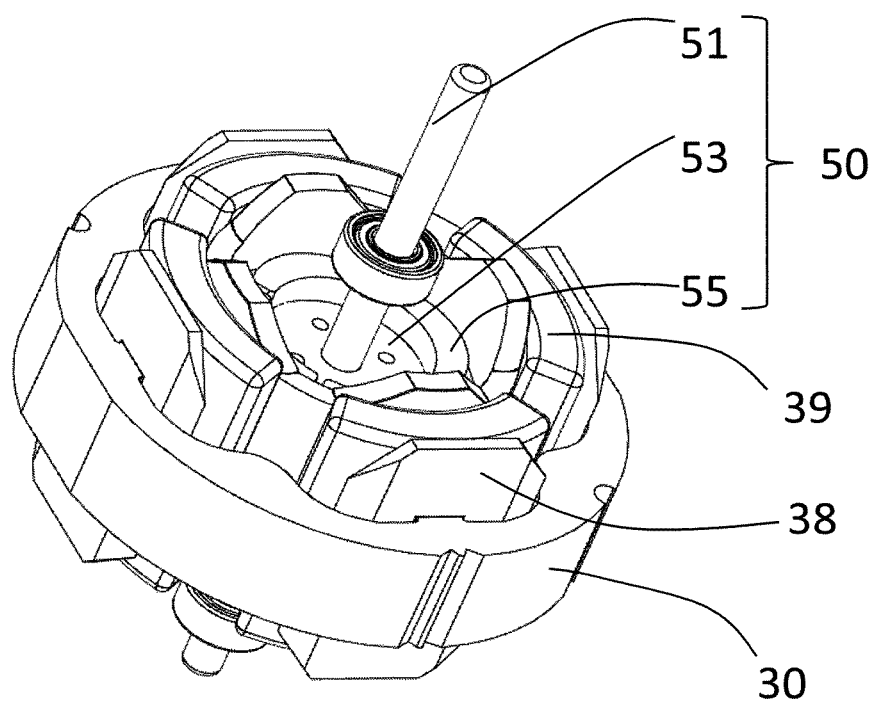
FIG. 2 illustrates the single phase permanent magnet motor of FIG. 1, with an outer housing being removed.
Figure 3:
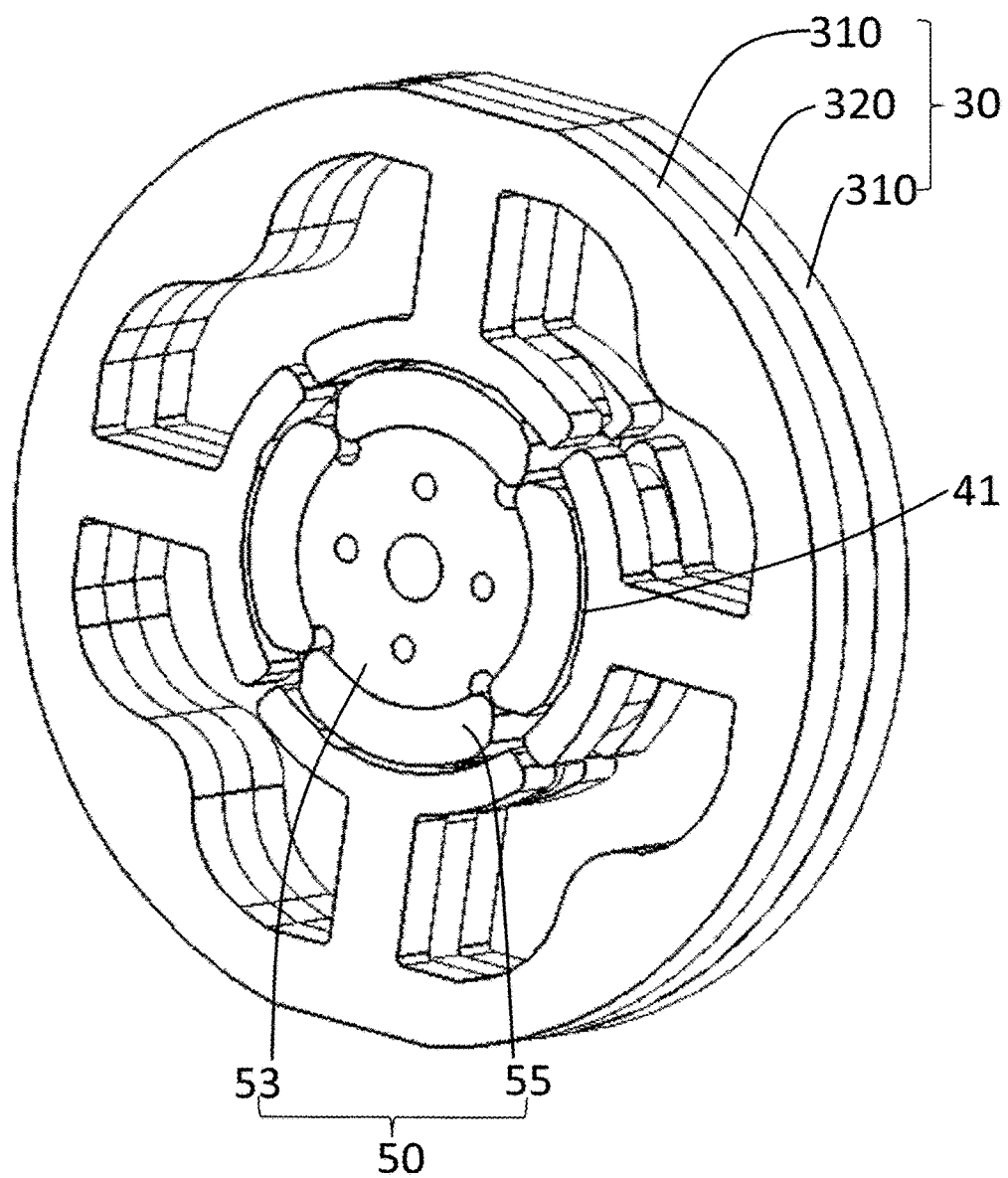
FIG. 3 illustrates the single phase permanent magnet motor of FIG. 1, with the outer housing, stator winding and rotary shaft being removed.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

First Embodiment

Referring to FIG. 1 to FIG. 5, the single phase permanent magnet motor 10 in accordance with a first embodiment of the present invention includes a stator 20 and a rotor 50 rotatable relative to the stator.

The stator 20 includes a cylindrical outer housing 21 with one open end, an end cap 23 mounted to the open end of the outer housing 21, a stator core 30 mounted in the outer housing 21, an insulating bracket 38 mounted to the stator core 30, and a winding 39 wound around the stator core and supported by the insulating bracket 38. The stator core 30 is formed by stacking a plurality of first stator core laminations 310 and a plurality of second stator core laminations 320. Each first stator core lamination 310 includes a first outer ring portion 311, a plurality of first tooth bodies 313 extending inwardly from the first outer ring portion 311, and a first pole shoe 315 extending from a distal end to two circumferential sides of each first tooth body 313, with a first slot opening 317 defined between each two adjacent first pole shoes 315. The second stator core lamination 320 includes a second outer ring portion 321, a plurality of second tooth bodies 323 extending inwardly from the second outer ring portion 321, and a second pole shoe 325 extending from a distal end to two circumferential sides of each second tooth body 323, with a second slot opening 327 defined between each two adjacent second pole shoes 325. A width of the second slot opening 327 is greater than a width of the first slot opening 317. The first outer ring portion 311 and the second outer ring portion 321 are stacked along an axial direction of the motor 10, the first tooth bodies 313 and the corresponding second tooth bodies 323 are stacked along the axial direction of the motor, and the first pole shoes 315 and the corresponding second pole shoes 325 are stacked along the axial direction of the motor. In one specific embodiment, the first stator core laminations 310 and the second stator core laminations 320 are alternately stacked in a predetermined pattern. The present invention is not intended to limit the number of the first stator core laminations 310 and the second stator core laminations 320 to a particular value, and the pattern in which the first and second stator core laminations 310 and 320 are alternately arranged may also vary depending upon actual requirements. For example, each first stator core lamination 310 is alternately arranged with each second stator core lamination 320 or, alternatively, each group of two first stator core laminations 310 is alternately arranged with each group of two or three second stator core laminations 320. In the embodiment illustrated in FIG. 3, each first stator core lamination 310 is alternately arranged with each second stator core lamination 320. It should be understood that it is not intended to limit the number of the stator core laminations to three layers.

The winding 39 is wound around the first tooth bodies 313 and second tooth bodies 323 that are stacked along the axial direction of the motor, and is isolated from the stator core 30 by the insulating bracket 38. The rotor 50 is received within a receiving space cooperatively defined by the first pole shoes 315 and the second pole shoes 325 that are stacked along the axial direction of the motor. The stacked first pole shoes 315 and second pole shoes 325, and the rotor 50 bound a radial air gap 41 therebetween.

The rotor 50 includes a rotary shaft 51, a rotor core 53, and a plurality of permanent magnetic poles 55. The rotary shaft 51 passes through a center of the rotor core 53 and is fixed to the rotor core 53. One end of the rotary shaft 51 is mounted to the end cap 23 of the stator 20 through a bearing 24, and the other end of the rotary shaft 51 is mounted to a bottom of the cylindrical outer housing 21 of the stator 20 through another bearing, such that the rotor 50 is capable of rotation relative to the stator 20.

Figure 6:
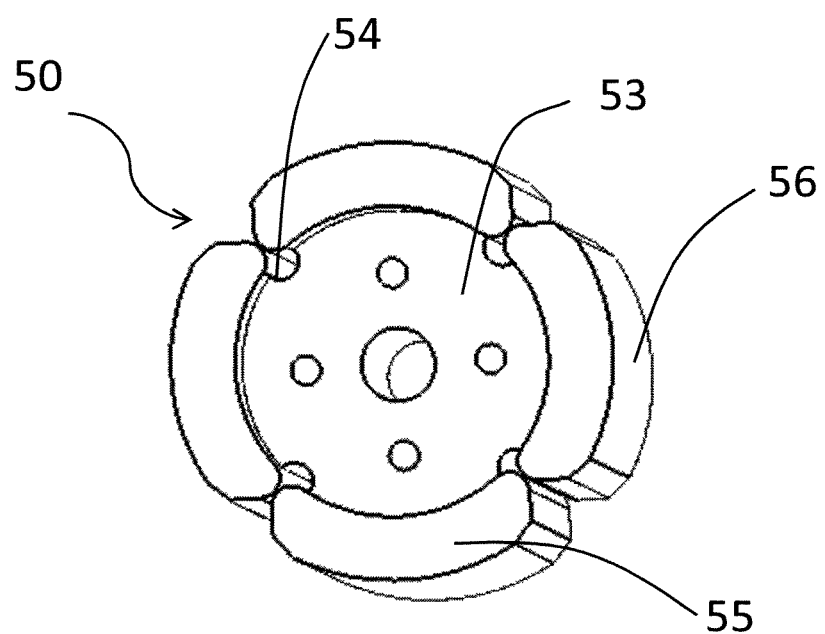
FIG. 6 illustrates a rotor core and permanent magnet members of the single phase permanent magnet motor of FIG. 3.

Referring to FIG. 6, the permanent magnetic poles 55 of the present embodiment are formed by a plurality of permanent magnet members 56 such as four permanent magnet members 56. An outer circumferential surface of the rotor core 53 defines a plurality of axially-extending grooves 54. Each groove 54 is disposed at a junction of two adjacent permanent magnet members 56 to reduce magnetic leakage. The permanent magnet members 56 are mounted to the outer circumferential surface of the rotor core 53. In this embodiment, inner surfaces of the first pole shoes 315 and second pole shoes 325 are located on concentric circles centered at the center of the rotor 50 in an axial plan view. Outer surfaces of all the permanent magnet members 56 are located on a cylindrical surface centered at the center of the rotor 50, such that an even air gap 41 is defined between the stator pole shoes 315, 325 and the rotor permanent magnetic poles 55. Preferably, the width of the first slot opening 317 is greater than zero and less than or equal to four times of a thickness of the air gap 41. The term "thickness" of the air gap 41 used in this disclosure refers to a radial thickness of the air gap.

Figure 4:
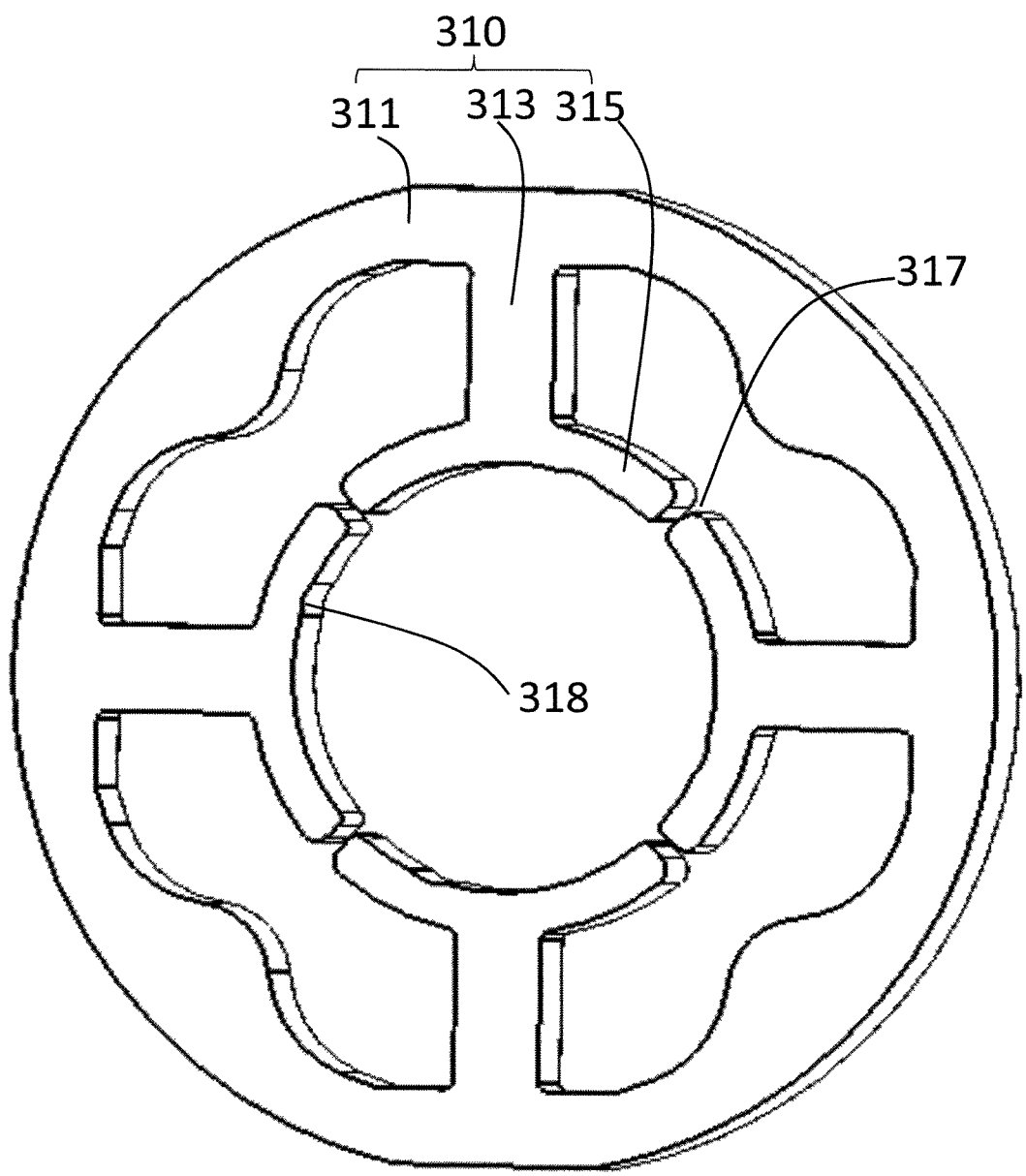
FIG. 4 illustrates a first stator core lamination of the single phase permanent magnet motor of FIG. 3.
Figure 5:
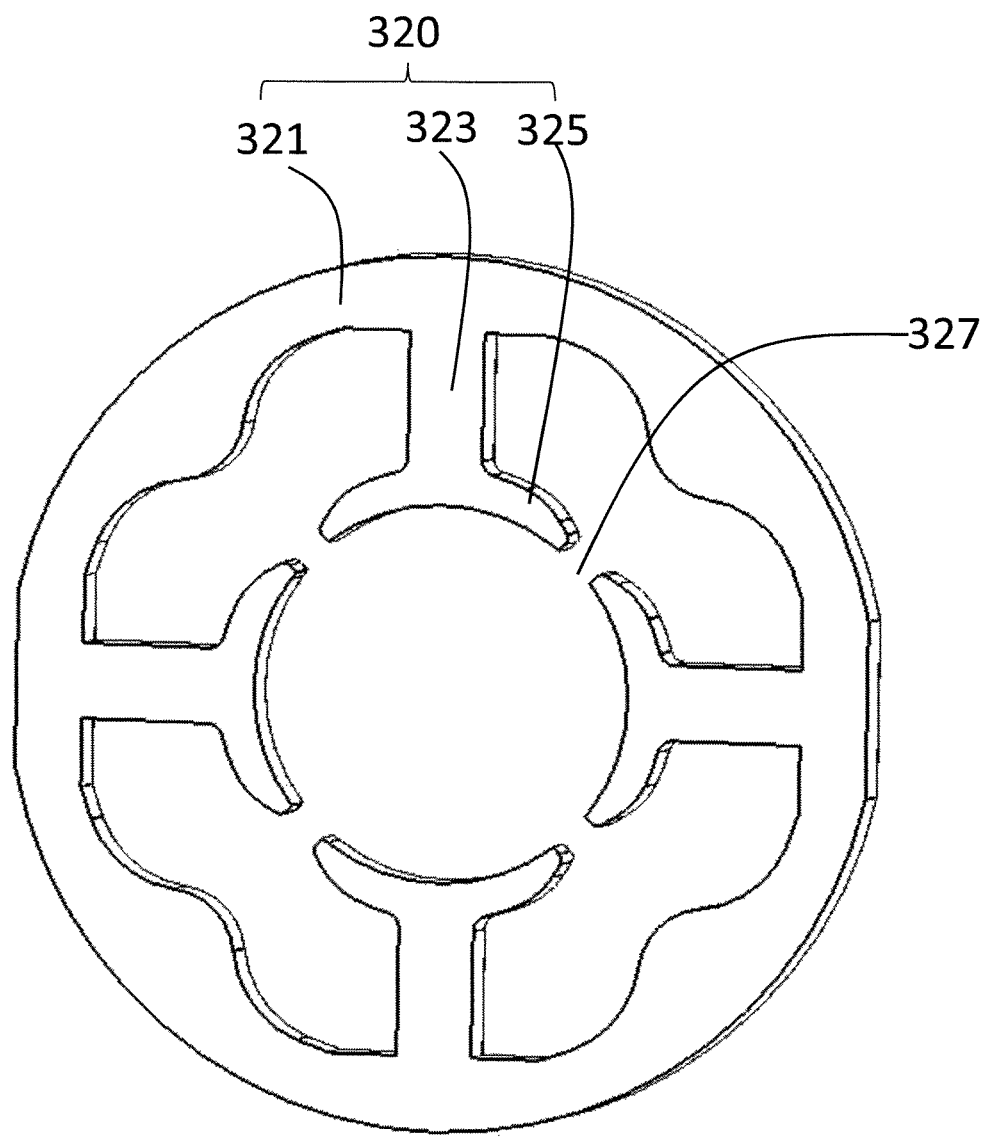
FIG. 5 illustrates a second stator core lamination of the single phase permanent magnet motor of FIG. 3.

Referring to FIG. 4, in the first stator core lamination 310, the first pole shoe 315 between each two adjacent first tooth bodies 313 (including the portion of the pole shoe 315 radially aligned with the first tooth body 313) defines a positioning slot 318. The number of the positioning slots 318 is the same as the number of the poles of the stator and the number of the permanent magnetic poles 55, or the number of the positioning slots 318 is an integer times of the number of the permanent magnetic poles 55. In the present embodiment, the number of the positioning slots 318 is four. In the present embodiment, the stator winding is a concentrated winding and, therefore, the number of the tooth bodies is the same as the number of the poles of the stator. In an alternative embodiment, the number of the stator tooth bodies can be an integer times of the number of the stator poles, such as, two times, three times or the like.

Each positioning slot 318 is spaced from the two adjacent first tooth bodies 313 by different distances. The positioning slot 318 is closer to one of the two adjacent first tooth bodies 313, and a center of the positioning slot 318 is offset from a symmetry center of one adjacent first tooth body 313. The positioning slot 318 is mainly used to control the position of the rotor 50 relative to the stator 20 when stopping and prevents the rotor 50 from stopping at a dead point.

When the motor 10 is not energized, i.e. at an initial position, due to the positioning slot 318, the pole axis of the permanent magnetic pole 55 of the rotor 50 is offset from the center line of the stator tooth body, i.e. a stator pole axis, such that the rotor 50 is offset from a dead point. An angle formed between the pole axis of the permanent magnetic pole 55 and the stator pole axis is referred to as a startup angle. In this embodiment, the startup angle is greater than 45 degrees electric angle and less than 135 degrees electric angle. When the winding 39 of the motor 10 is supplied with an electric current in one direction, the rotor 50 can be started along one direction. When the winding 39 of the motor 10 is supplied with an electric current in an opposite direction, the rotor 50 can be started along an opposite direction. It should be understood that, when the startup angle is equal to 90 degrees electric angle, the rotor 50 can be easily started in both directions, i.e. it is the easiest angle to achieve bidirectional startup. When the startup angle is offset from the 90-degree electric angle, the rotor is easier to start in one direction than in the opposite direction. It has been found from a large number of experiments that, when the startup angle is in the range of 45 degrees to 135 degrees electric angle, the startup of the rotor 50 in both directions has good reliability.

In this embodiment, the second stator core lamination 320 is configured to have a symmetrical structure. Portions of each second pole shoe 325 at opposite sides of a center line of the corresponding second tooth body 323 are symmetrical about the center line of the second tooth body 323. Preferably, the radial thickness of each second pole shoe 325 of the second stator core lamination 320 progressively decreases in a direction from the corresponding second tooth body 323 to the second slot openings 327, such that the magnetic reluctance of the second pole shoe 325 progressively increases in the direction from the second tooth body 323 to the second slot openings 327.

The first stator core lamination 310 and the second stator core lamination 320 may be made from magnetic-conductive soft magnetic material. For example, the first stator core lamination 310 and the second stator core lamination 320 are formed by stacking magnetic laminations (silicon laminations commonly used in the industry) along the axial direction of the motor. When the first stator core laminations 310 and the second stator core laminations 320 are stacked, centers of the first slot openings 317 align with centers of the second slot openings 327. In this embodiment, each of the first slot openings 317 and second slot openings 327 is located at a middle position between two corresponding adjacent first tooth bodies 313 and second tooth bodies 323.

Second Embodiment

Figure 7:
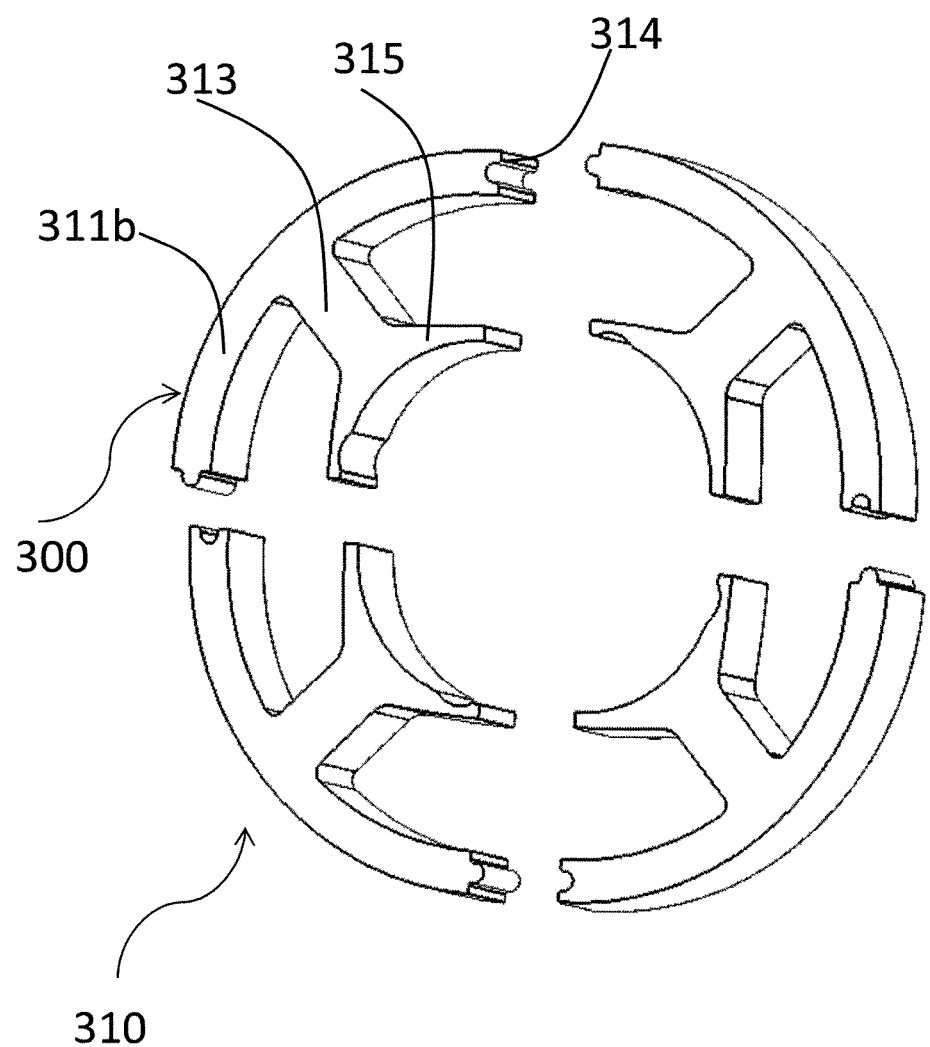
FIG. 7 illustrates a first stator core lamination according to a second embodiment of the present invention.
Figure 8:
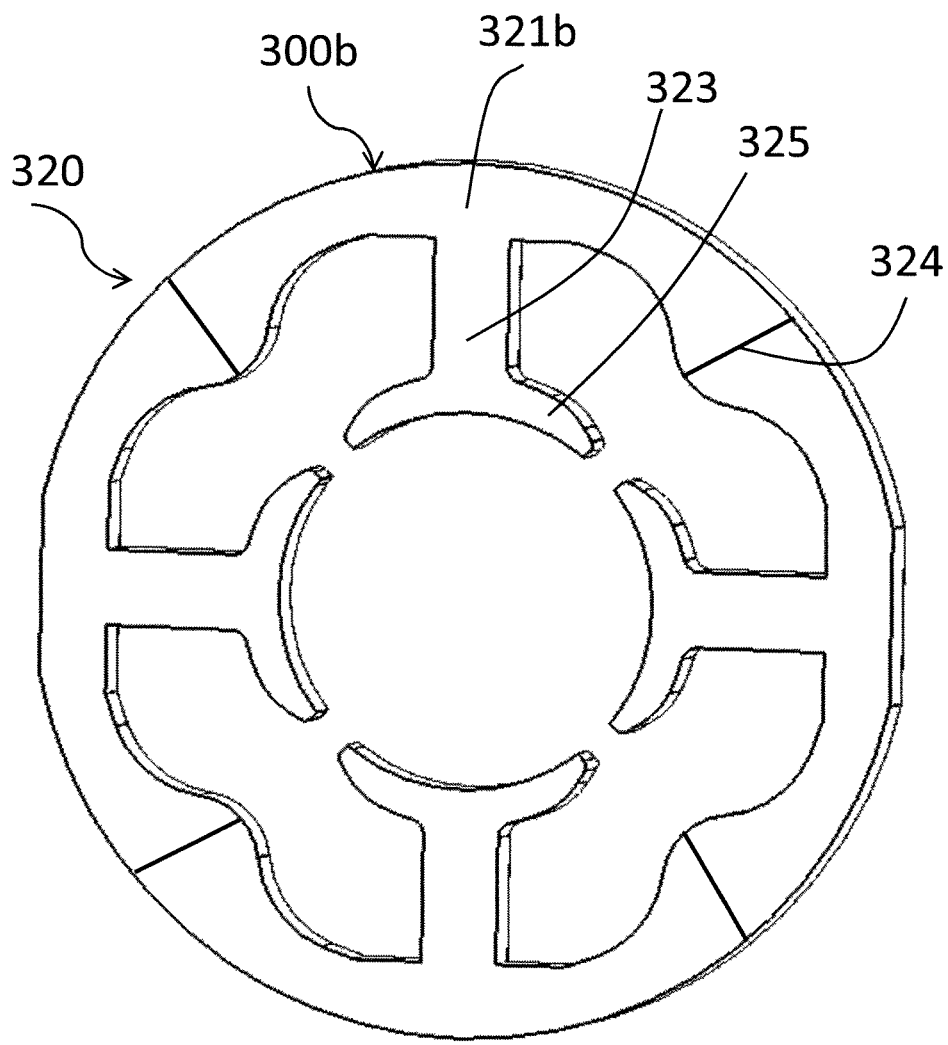
FIG. 8 illustrates a second stator core lamination according to the second embodiment of the present invention.

Referring to FIG. 7 and FIG. 8, different from the first embodiment, in order to increase the winding efficiency of the winding 39, the first stator core lamination 310 includes a plurality of first stator core parts 300 joined along a circumferential direction of the stator. Each first stator core part 300 includes a first arcuate yoke segment 311*b*, a first tooth body 313 extending from the first arcuate yoke segment 311*b*, and a first pole shoe 315 extending from a radial distal end of the first tooth body 313 to two circumferential sides of the first tooth body 313. In this embodiment, each first stator core part 300 includes a single first tooth body 313 and one associated first pole shoe 315. It should be understood that, each stator core part may also include more than one first tooth bodies 313 and corresponding first pole shoes 315. The second stator core lamination 320 also includes a plurality of second stator core parts 300*b* joined along the circumferential direction of the stator. Each second stator core part 300*b* includes a second arcuate yoke segment 321*b*, a second tooth body 323 extending from the second arcuate yoke segment 321*b,* and a second pole shoe 325 extending from a radial distal end of the second tooth body 323 to two circumferential sides of the second tooth body 323.

In assembly, the first stator core parts 300 and the second stator core parts 300*b* are stacked together, and the insulating bracket is mounted, followed by the winding of the windings. After the winding of the windings is completed, the stacked first stator core parts 300 and second stator core parts 300*b* are joined to obtain the stator core with stator windings.

In this embodiment, a recess-protrusion engagement structure is formed at a joining area between the first arcuate yoke segments 311*b* of two adjacent first stator core parts 300. Specifically, in forming the recess-protrusion structure, two ends of the first arcuate yoke segment 311*b* of each first stator core part 300 for being connected to form the first outer ring portion may be provided with an engagement recess 314 and an engagement protrusion 312, respectively. The engagement recess 314 and the engagement protrusion 312 together form the recess-protrusion engagement structure. Similarly, a recess-protrusion engagement structure 324 may also be formed at a joining area between the second arcuate yoke segments 321b of two adjacent second stator core parts 300b.

Because the stator core is formed by joining multiple stacked first stator core parts 300 and second stator core parts 300b, the first slot opening between the adjacent first pole shoes 315 and/or the second slot opening between the second pole shoes 325 can have a very small width. In this disclosure, the width of the first slot opening refers to the distance between two adjacent first pole shoes, and the width of the second slot opening refers to the distance between two adjacent second pole shoes.

Figure 9:
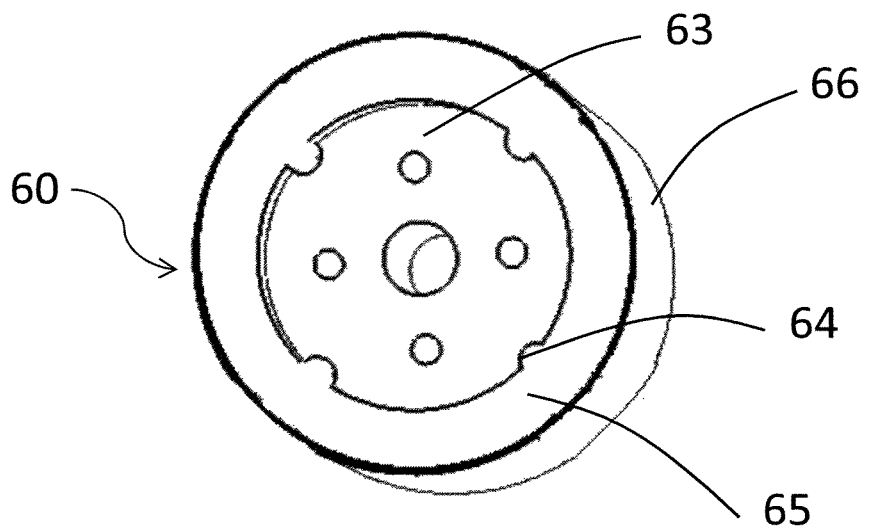
FIG. 9 illustrates a rotor core and permanent magnet members according to the second embodiment of the present invention.

Referring to FIG. 9, in this embodiment, the rotor 60 includes a rotor core 63 and ring shaped permanent magnetic poles 65 arranged along the circumferential direction of the rotor core 63. An outer circumferential surface of the ring shaped permanent magnetic poles 65 is concentric with the inner circumferential surfaces of the first pole shoes and second pole shoes, such that the air gap 41 formed therebetween is an even air gap. Specifically, the inner surfaces of the first pole shoes and the second pole shoes are located on a circle centered at the center of the rotor 60 in the axial plan view. An outer surface of the ring shaped permanent magnetic poles 65 is cylindrical, and is located on a circle centered at the center of the rotor 60 in the axial plan view, thus forming the even air gap between the inner circumferential surface of the first pole shoes and second pole shoes and the outer circumferential surface of the permanent magnetic poles 65.

The ring shaped permanent magnet poles 65 may be formed by a single ring shaped permanent magnet member 66 mounted to the outer circumferential surface of the rotor core 63. An outer circumferential surface of the rotor core 63 is provided with a plurality of axially extending grooves 64. Each groove 64 is located at a junction between two permanent magnetic poles 65 to reduce magnetic leakage.

Third Embodiment

Figure 10:
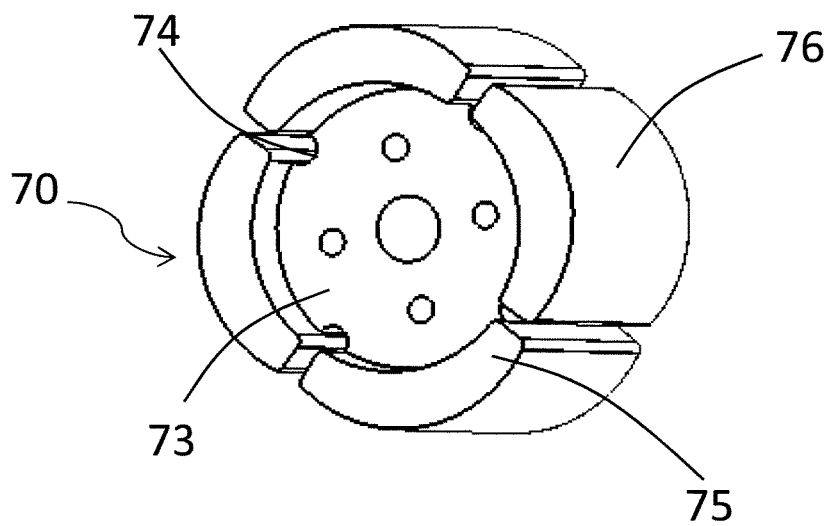
FIG. 10 illustrates a rotor core and permanent magnet members according to a third embodiment of the present invention.

Referring to FIG. 10, in this embodiment, the rotor 70 includes a plurality of permanent magnetic poles 75 arranged along a circumferential direction of the rotor. An outer surface of each permanent magnetic pole 75 is an arc surface. The outer circumferential surface of the permanent magnetic pole 75 is spaced from a center of the rotor 70 by a distance that progressively decreases from a circumferential center to two circumferential ends of the outer circumferential surface. The stator may be the same as the stator of the embodiments above. When the inner surfaces of the first pole shoe 315 and the second pole shoe 325 are located on a cylindrical surface centered at the center of the rotor, the permanent magnetic poles 75 and the inner circumferential surfaces of the first pole shoes 315 and second pole shoes 325 form therebetween a symmetrical uneven air gap. Preferably, the symmetrical uneven air gap has a maximum thickness that is at least 1.5 times of its minimum thickness. Preferably, the width of the first slot opening 317 is greater than zero and less than or equal to four times of the minimum thickness of the uneven air gap.

Each permanent magnetic pole 75 may be formed by a single permanent magnet member 76. The rotor 70 further includes a rotor core 73. The permanent magnet member 76 is mounted to an outer circumferential surface of the rotor core 73. The outer circumferential surface of the rotor core 73 is provided with a plurality of axially extending grooves 74. Each groove 74 is located at a junction between two adjacent permanent magnetic poles 75 to reduce magnetic leakage.

Figure 11:
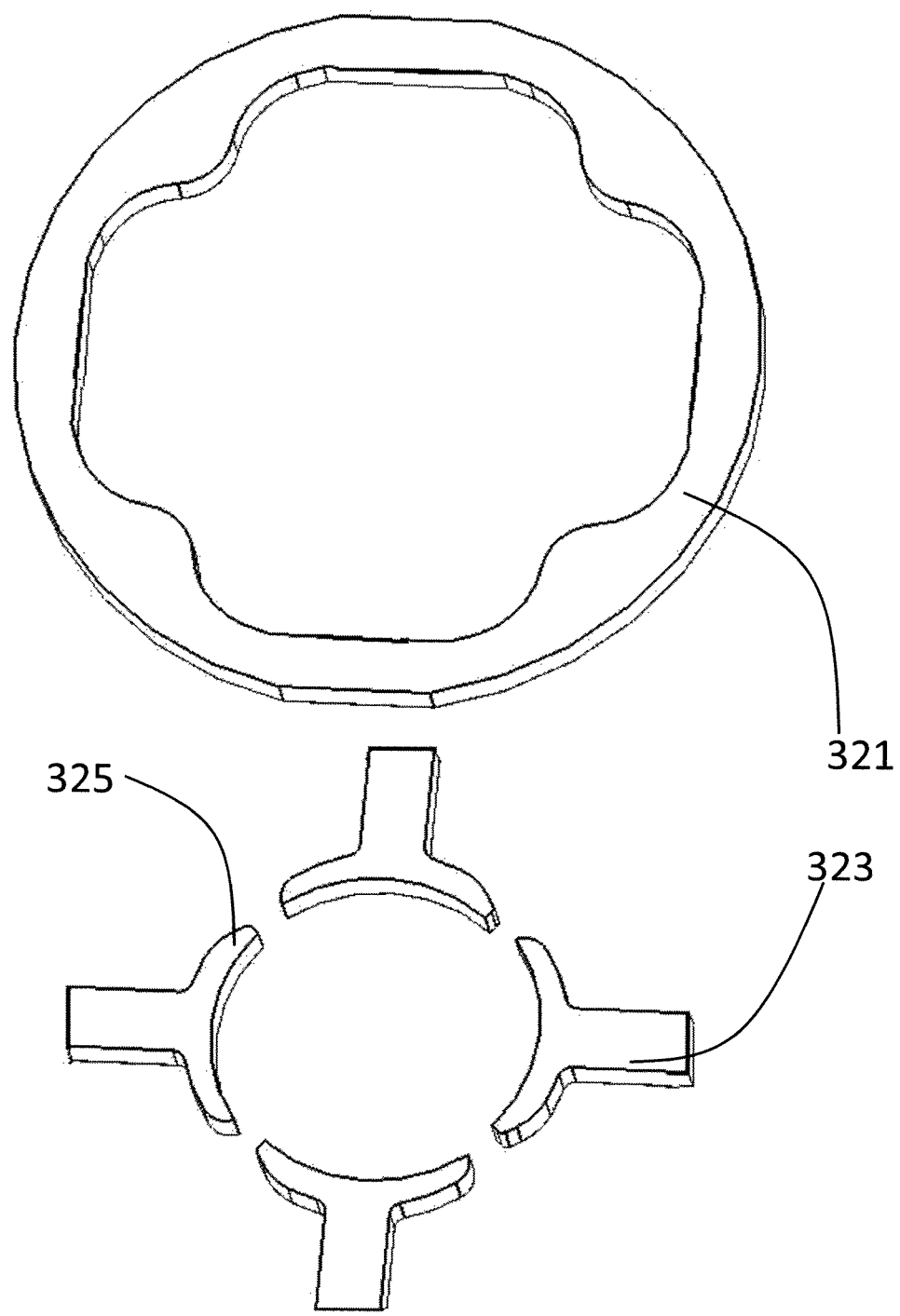
FIG. 11 illustrates a first stator core lamination according to the third embodiment of the present invention.

Referring to FIG. 11, in this embodiment, in order to increase the winding efficiency of the windings 39, the stator core may be of a split-type structure. Specifically, the first tooth bodies 313 and the first outer ring portion 311 of FIG. 4 of the first embodiment are separately formed and then assembled together. Likewise, the second tooth bodies 323 and the second outer ring portion 321 are separately formed and then assembled together. In the present embodiment, the second tooth bodies 323 and the corresponding second pole shoes 325 are integrally formed into an integral structure, and this integral structure is separate from the second outer ring portion 321. In assembly, the first tooth bodies 313 and the second tooth bodies 323 are stacked with each other. The insulating bracket is then mounted and the windings are wound. The first outer ring portions 311 and the second outer ring portions 321 are stacked to form a cylinder. After winding of the windings is completed, the first tooth bodies 313 and the second tooth bodies 323 are mounted inside the cylinder formed by stacked first outer ring portions 311 and second outer ring portions 321, thus achieving the stator core with windings.

Fourth Embodiment

Figure 12:
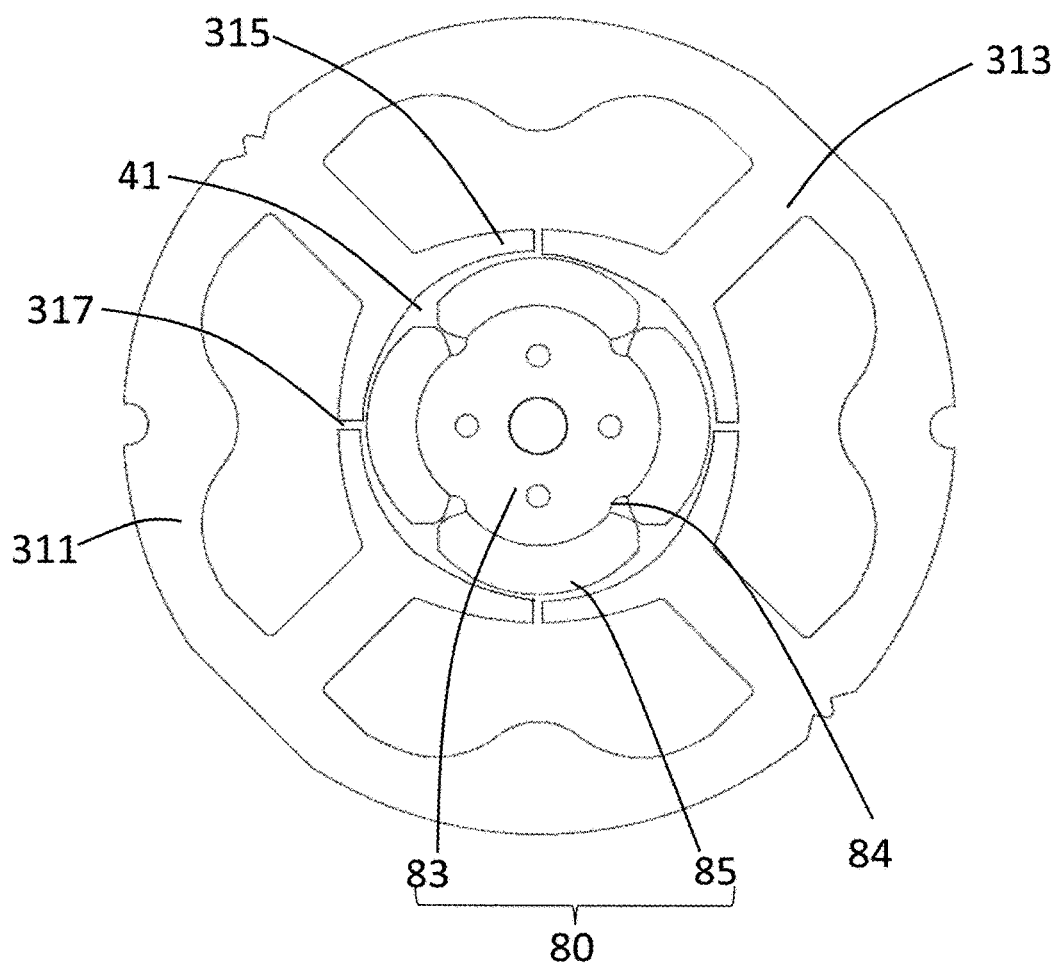
FIG. 12 illustrates a first stator core lamination, a rotor core and permanent magnet members according to a fourth embodiment of the present invention.

Referring to FIG. 12, in this embodiment, the rotor 80 includes a plurality of permanent magnetic poles 85 arranged along a circumferential direction of the rotor 80. An outer surface of each permanent magnetic pole 85 is an arc surface. Each permanent magnetic pole 85 is formed by a single permanent magnet member mounted to an outer circumferential surface of a rotor core 83. The outer circumferential surface of each permanent magnetic pole 85 is spaced from a center of the rotor 80 by a distance that progressively decreases from a circumferential center to two circumferential ends of the outer circumferential surface. The outer circumferential surface of the rotor core 83 is provided with a plurality of axially extending grooves 84. Each groove 84 is located at a junction between two adjacent permanent magnetic poles 85 to reduce magnetic leakage. In this embodiment, the thickness of the permanent magnet member is uniform, while the outer circumferential surface of the rotor core 83 between each two grooves 84 is spaced from the center of the rotor 80 by a distance that progressively decreases from a circumferential center to two circumferential ends, and the inner circumferential surfaces of the permanent magnet members match with the outer circumferential surfaces of the rotor core 83 in shape. Alternatively, the outer circumferential surface of the rotor core 83 is located on a cylindrical surface centered at the center of the rotor 80, while the thickness of the permanent magnet member is non-uniform, which progressively decreases from a circumferential center to two circumferential ends thereof.

Figure 13:
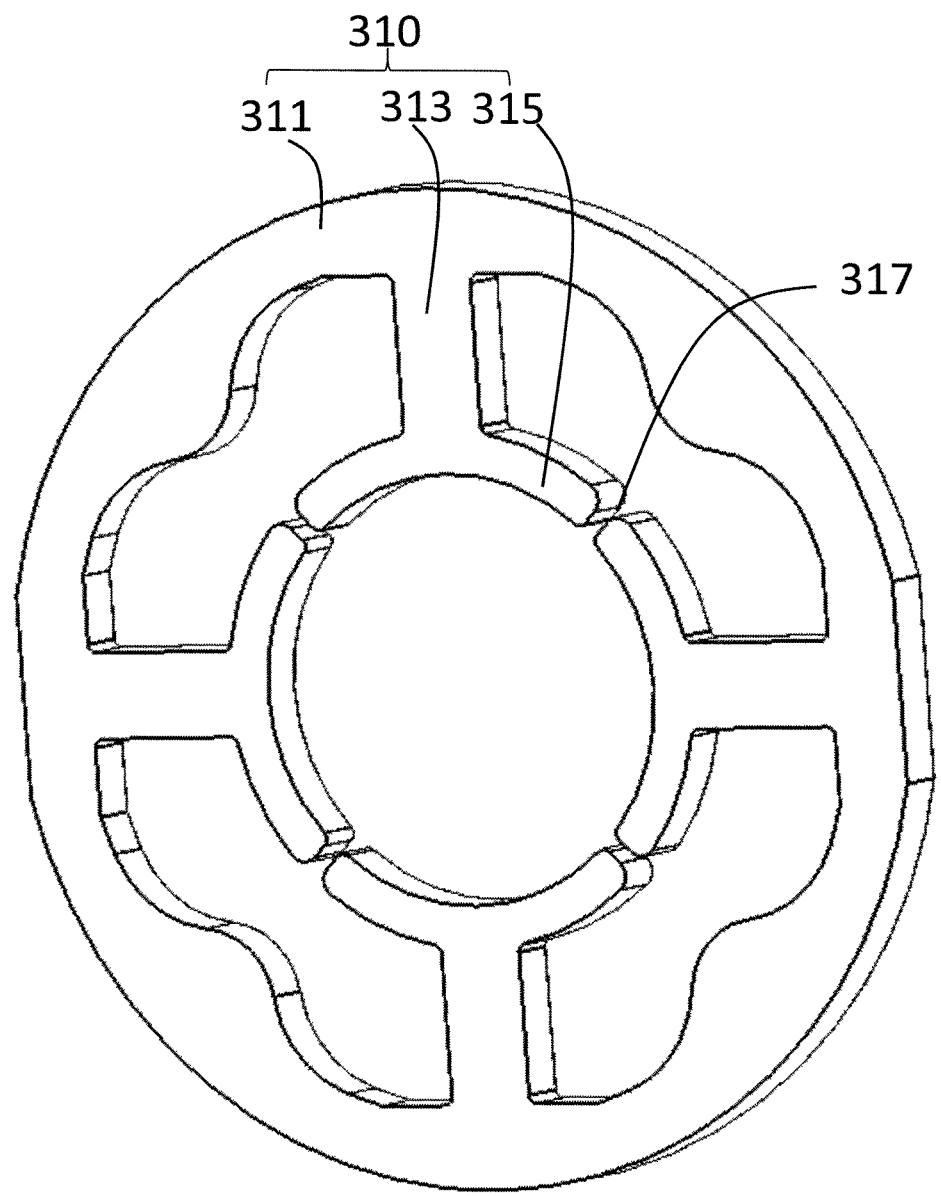
FIG. 13 illustrates the first stator core lamination according to the fourth embodiment of the present invention.
Figure 14:
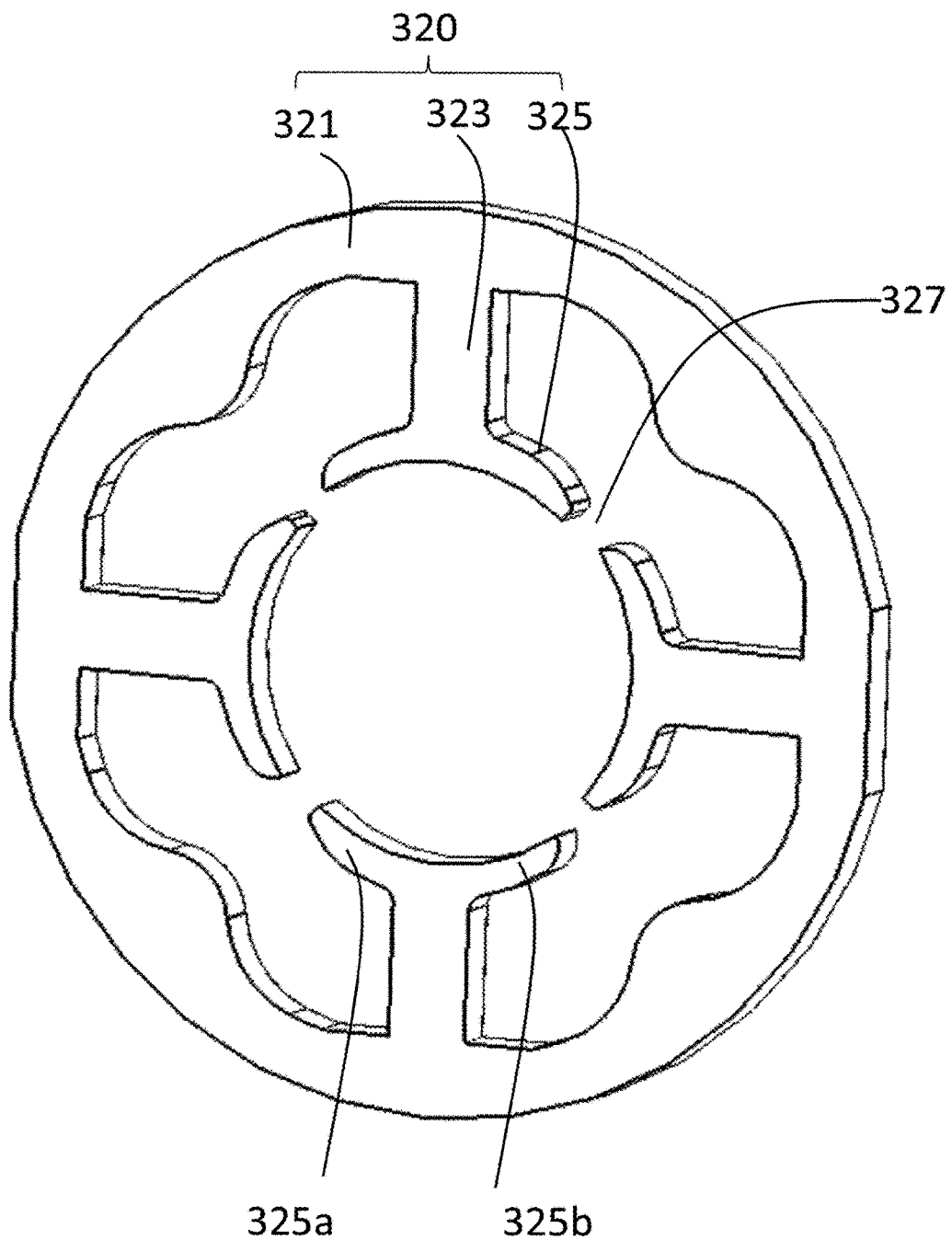
FIG. 14 illustrates a second stator core lamination according to the fourth embodiment of the present invention.

Referring to FIG. 13 and FIG. 14, different from the above embodiment, the first stator core lamination 310 of this embodiment does not form a positioning slot. The inner surface of the first pole shoe 315 is located on a cylindrical surface. In this case, portions of each second pole shoe 325 of the second stator core lamination 320 at opposite sides of a center line of the corresponding second tooth body 323 are asymmetric about the center line of the second tooth body 323. Specifically, in this embodiment, a radial width of the portion 325a of each second pole shoe 325 on the left side of the tooth body 323 is greater than a radial width of the portion 325b of the pole shoe 325 on the right side of the tooth body 323, the inner surface of each second pole shoe 325 is spaced from the rotor center by a changing distance. For example, the inner surface of each second pole shoe 325 is spaced from the rotor center by a distance that progressively increases from one end to the other end along the circumferential direction of the motor, such that the air gap 41 formed between the stator 20 and the rotor 80 progressively increases from one end to the other end of each second pole shoe 325, thereby achieving the positioning of the rotor 80.

Fifth Embodiment

Figure 15:
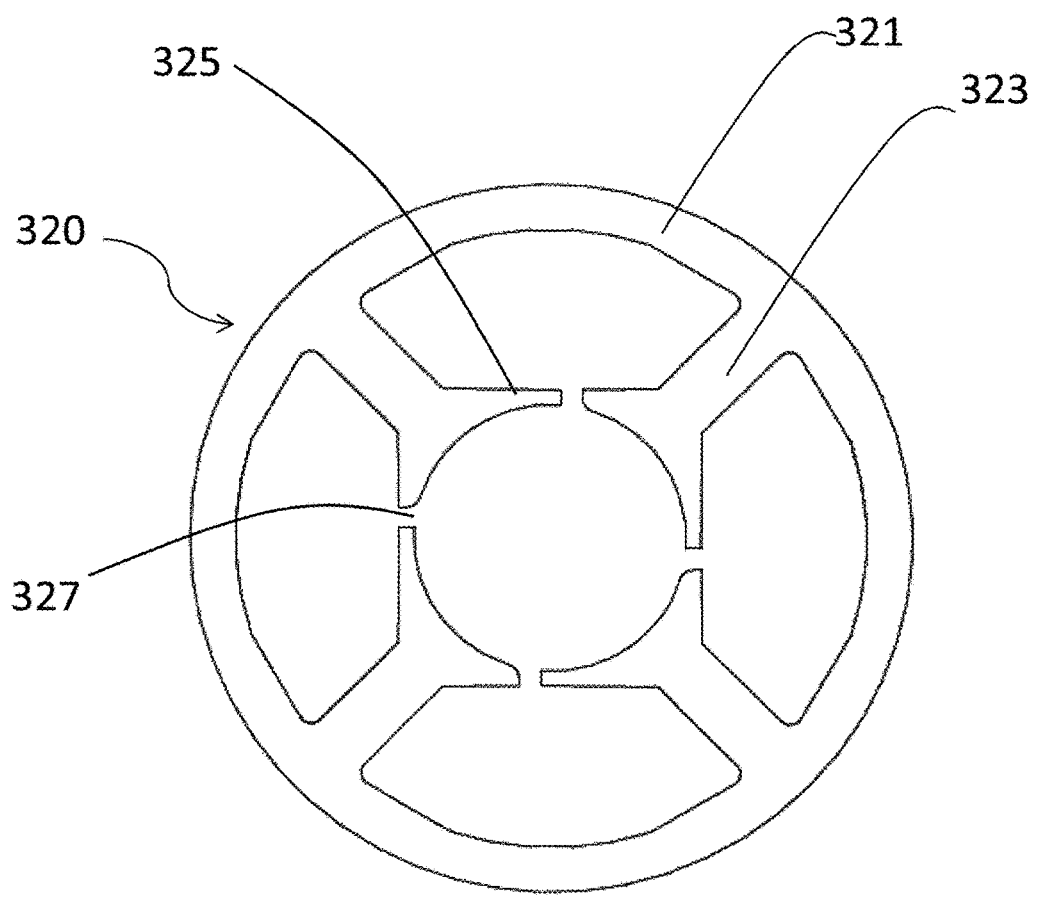
FIG. 15 illustrates a second stator core lamination according to a fifth embodiment of the present invention.

Referring to FIG. 15, in this embodiment, portions of each second pole shoe 325 of the second stator core lamination 320 at opposite sides of a center line of the corresponding second tooth body 323 have different lengths. In this case, the inner surfaces of the second pole shoes 325 may also be located on a cylindrical surface centered at the center of the rotor. That is, the inner surfaces of the second pole shoes 325 are spaced from the rotor center by a uniform distance, which likewise makes the initial position of the rotor offset from the dead point. In this embodiment, the second slot opening 327 of the second stator core lamination 320 may also be a small slot opening, a width of the second slot opening 327 is less than or equal to a width of a first slot opening 317 of a first stator core lamination 310.

The single phase permanent magnet motor of embodiments of the present invention includes a stator core that is formed by stacking first stator core laminations and second stator core laminations with different inner structures. This reduces the vibration and noise produced in the conventional motor due to the unduly large slot openings, thereby improving the reliability of the motor startup. In addition, the startup angle and the cogging torque needed during startup can be easily adjusted according to design requirements, thus reducing or eliminating the startup dead points and hence increasing the reliability of the motor startup. For example, the motor startup angle can be easily adjusted by adjusting the position of the positioning slots of the first pole shoes. When the startup angle Q is greater than a 45-degree electric angle and less than a 135-degree electric angle, the rotor can achieve bidirectional startup. The width of the first slot opening of the first stator core lamination is less than or equal to four times of the thickness of the air gap, which avoids a sudden change of magnetic reluctance that would occur in the prior art due to the large slot opening between the adjacent stator pole shoes, thereby reducing the cogging torque of the motor. When the stator core is of a split-type structure, the winding process can be performed by using a high efficiency winding machine prior to the assembly of the tooth bodies and the outer ring portion, which increases the winding efficiency.

It should be understood that, the rotors and stators of the above embodiments may be used in different combinations, i.e. the rotor of each embodiment may be used in combination with the stator of any embodiment, and the stator of each embodiment may be used in combination with the rotor of any embodiment.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase permanent magnet motor comprising:
a stator comprising a stator core and a winding wound around the stator core, the stator core comprising:
at least one first stator core lamination each comprising a first outer ring portion, a plurality of first tooth bodies coupled to the first outer ring portion, and a plurality of first pole shoes each extending from a distal end to two circumferential sides of a corresponding first tooth body; and
at least one second stator core lamination stacked with the first stator core lamination, the second stator core lamination comprising a second outer ring portion, a plurality of second tooth bodies coupled to the second outer ring portion, and a plurality of second pole shoes each extending from a distal end to two circumferential sides of a corresponding second tooth body, the structures of the first pole shoes and the second pole shoes being different, the first pole shoes and the second pole shoes being stacked substantially along the axial direction of the motor; and
a rotor rotatable relative to the stator, the rotor comprising a plurality of permanent magnetic poles.

2. The single phase permanent magnet motor of claim 1, wherein a first slot opening is defined between each two adjacent first pole shoes, a second slot opening is defined between each two adjacent second pole shoes, a width of the first slot opening is not equal to a width of the second slot opening.

3. The single phase permanent magnet motor of claim 1, wherein the first outer ring portion and the second outer ring portion are stacked substantially along an axial direction of the motor, the first tooth bodies and the second tooth bodies are stacked substantially along the axial direction of the motor.

4. The single phase permanent magnet motor of claim 3, wherein portions of each second pole shoe at opposite sides of a center line of one corresponding second tooth body are asymmetric about the center line of the corresponding second tooth body.

5. The single phase permanent magnet motor of claim 4, wherein the portions of each second pole shoe at opposite sides of the center line of the corresponding second tooth body have different lengths.

6. The single phase permanent magnet motor of claim 4, wherein inner surfaces of the portions of each second pole shoe at opposite sides of the center line of the corresponding second tooth body are spaced from a center of the rotor by a changing distance.

7. The single phase permanent magnet motor of claim 3, further comprising a positioning slot defined in each first pole shoe, and each positioning slot is spaced from two adjacent first tooth bodies by different distances.

8. The single phase permanent magnet motor of claim 7, wherein the number of the positioning slots is equal to or an integer times of the number of the permanent magnetic poles of the rotor.

9. The single phase permanent magnet motor of claim 7, wherein the positioning slot is a groove exposed from an inner circumferential surface of the first pole shoe.

10. The single phase permanent magnet motor of claim 7, wherein the positioning slot is an invisible hole located between an outer circumferential surface and the inner circumferential surface of the first pole shoe.

11. The single phase permanent magnet motor of claim 3, wherein the first tooth bodies and the first outer ring portion are separately formed, and the second tooth bodies and the second outer ring portion are separately formed.

12. The single phase permanent magnet motor of claim 3, wherein:
the first stator core lamination comprises a plurality of first stator core parts joined along a circumferential direction of the stator, each first stator core part comprises a first arcuate yoke segment, the first tooth body extending from the first arcuate yoke segment, and the first pole shoe extending from a radial distal end of the first tooth body to two circumferential sides of the first tooth body; and the second stator core lamination comprises a plurality of second stator core parts joined along the circumferential direction of the stator, each second stator core part comprises a second arcuate yoke segment, the second tooth body extending from the second arcuate yoke segment, and the second pole shoe extending from a radial distal end of the second tooth body to two circumferential sides of the second tooth body.

13. The single phase permanent magnet motor of claim 1, wherein inner circumferential surfaces of the first pole shoes of the first stator core lamination are located on a same cylindrical surface.

14. The single phase permanent magnet motor of claim 1, wherein an inner circumferential surface of the first pole shoe and an inner circumferential surface of the second pole shoe are located on a same cylindrical surface.

15. The single phase permanent magnet motor of claim 1, wherein the first pole shoes and the second pole shoes cooperatively define a receiving space therebetween, the rotor is disposed in the receiving space, and an outer circumferential surface of the permanent magnetic pole and inner circumferential surfaces of the first pole shoes or the second pole shoes are respectively located on two concentric cylindrical surfaces.

16. The single phase permanent magnet motor of claim 1, wherein inner circumferential surfaces of the first pole shoes or the second pole shoes are located on a cylindrical surface, and an outer circumferential surface of the permanent magnetic pole is spaced from a center of the rotor by a distance that progressively decreases from a circumferential center to two circumferential ends of the outer circumferential surface of the permanent magnetic pole.

17. The single phase permanent magnet motor of claim 1, wherein the stator core comprises at least one group of first stator core laminations and at least one group of second stator core laminations, each group of first stator core laminations comprises at least one said first stator core lamination, each group of second stator core laminations comprises at least one said second stator core lamination, the at least one group of first stator core laminations and the at least one group of second stator core laminations are alternately stacked along an axial direction of the motor.

18. The single phase permanent magnet motor of claim 1, wherein the first pole shoes and the second pole shoes cooperatively define a receiving space therebetween, the rotor is disposed in the receiving space, the first pole shoe and the permanent magnetic pole of the rotor form an air gap therebetween, and a width of the first slot opening is greater than zero and less than four times of a minimum thickness of the air gap.

* * * * *